March 28, 1950 C. O. GUERNSEY 2,502,320
VEHICLE BODY STRUCTURE
Filed Aug. 24, 1946 6 Sheets-Sheet 1

INVENTOR
CHARLES O. GUERNSEY
BY
Toulmin & Toulmin
ATTORNEY

March 28, 1950 C. O. GUERNSEY 2,502,320
VEHICLE BODY STRUCTURE
Filed Aug. 24, 1946 6 Sheets-Sheet 2

INVENTOR
CHARLES O. GUERNSEY
BY
Toulmin & Toulmin
ATTORNEY

March 28, 1950

C. O. GUERNSEY 2,502,320

VEHICLE BODY STRUCTURE

Filed Aug. 24, 1946

INVENTOR
CHARLES O. GUERNSEY
BY
Toulmin & Toulmin
ATTORNEYS

Patented Mar. 28, 1950

2,502,320

UNITED STATES PATENT OFFICE 2,502,320

VEHICLE BODY STRUCTURE

Charles O. Guernsey, Indianapolis, Ind., assignor to Marmon-Herrington Company, Inc., Indianapolis, Ind., a corporation of Indiana Application August 24, 1946, Serial No. 692,820

16 Claims. (Cl. 296—28)

This invention relates to vehicle structures and more particularly to the construction thereof as applied to trolley coaches and the like.

The primary object of the present invention is to provide an improved construction for vehicles such as trolley coaches in which greater strength is obtained without increasing the total weight of the vehicle.

Another object of the present invention is the provision of a method of constructing vehicles such that substantially all of the material applied in the construction of the vehicle adds to the strength thereof.

A particular object of this invention is the provision of a type of construction for trolley coaches which permits greater seating space without detracting in any way from the strength of the vehicle structure.

Still another object of the present invention is the provision of an improved method of mounting windows in a vehicle such as a trolley coach.

It is also an object to provide a type of construction for vehicles such as trolley coaches in which the stress on the walls and the roof of the vehicle are distributed uniformly through the several structural members which comprise the frame.

A further particular object is the construction of a trolley coach having inside and outside coverings such that both of the said coverings are stress members and contribute to the rigidity and strength of the assembled structure.

Another object is to provide a vehicle structure which is constructed principally of straight members so interconnected by rivets and gusset plates as to give great rigidity and strength while being easily repaired in the event of damage to the vehicle.

These and other objects and advantages will become more apparent upon reference to the following description taken in connection with the accompanying drawings in which.

General arrangement

A vehicle such as a trolley coach constructed according to this invention generally comprises a sub-frame having longitudinal sills connected at intervals by structural cross-members to form a substantially rigid frame.

Extending upwardly from the ends of the aforementioned cross-members are a plurality of posts on which are supported the inner and outer coverings of the vehicle walls. According to the present invention, both of the said coverings are rigidly connected with the said posts and form stress members which contribute to the strength of the vehicle structure.

The roof portion of the vehicle also comprises outer, and sometimes inner coverings rigidly connected with transverse members which latter, in turn, are rigidly connected with the vehicle posts in the side walls.

The arrangement is such that the entire side and roof portions of the vehicle form an integral unit with the stresses uniformly distributed throughout. In this manner a vehicle of given strength can be manufactured from lighter materials than has heretofore been possible. This is in contradistinction to the usual type of construction in which only one of the sheathings of the vehicle is employed as a stress member.

Also according to this invention, the inner covering of the vehicle is recessed adjacent the vehicle seats in between the vehicle side posts in order to provide for more seating space. This is accomplished without reducing the structural strength of the vehicle.

A further feature of this invention, resides in the fact that the windows are carried in sash which are mounted in frames or pans which are secured to apertures in the side walls of the vehicle. This affords simple assembly of the windows and at the same time creates a girder effect in the space beneath the windows which materially adds to the strength of the structure at a point where it would otherwise be weak.

*Structural arrangement*

Referring more particularly to the drawings, 20 indicates a trolley coach which is constructed according to the present invention. In Figures 1 through 6 it will be seen that the coach 20 comprises a sub-frame work generally indicated at 22 which includes a pair of longitudinally extending center sills 24. These sills are channel shaped and extend the length of the vehicle.

At spaced points along the sills 24 there are cross-members 26 which comprise a pair of channels which open away from each other and which are connected with the sills 24 as by the gussets 28.

Also extending transversely of the sills 24 and preferably secured to the upper surfaces of the cross-members 26 are the flanged floor supporting channels 30. While the cross-members 26 are interrupted to permit the passage of the sills therethrough, the floor supporting channels 30 extend continuously from one side of the vehicle to the other. The channels of the cross-members 26 and the floor supporting channels 30 are connected at their extreme ends with a flanged channel connector 32 which, in turn, is riveted to the vehicle posts 34. The assembly of the cross-member and the floor channels results in a rigid member which, when secured to the sills provides for an extremely strong sub-frame.

Figures 7, 8, 9, 10, 12, 13:
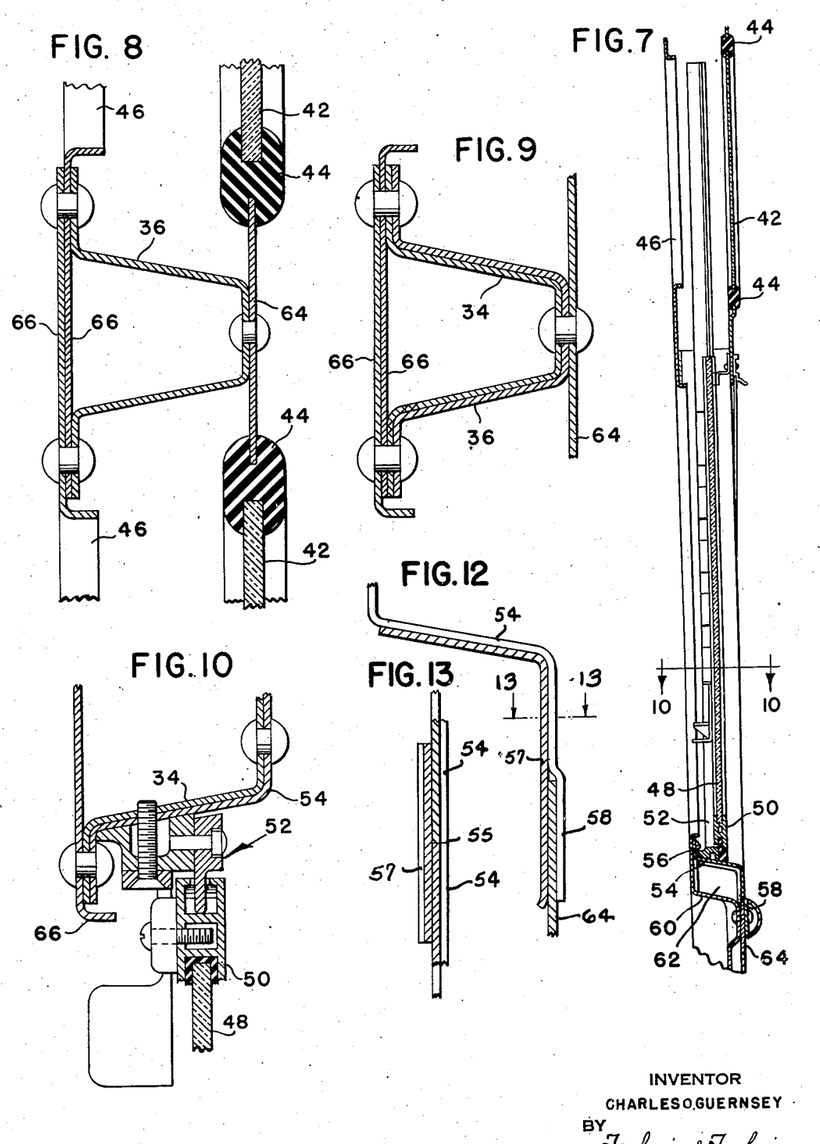
Figure 7 is a vertical section taken substantially on line 7—7 of Figure 1 and showing the window construction.
Figure 8 is a plan section indicated by the line 8—8 on Figure 1 and shows one of the supporting posts at the side of the coach and the means for supporting the upper window panels.
Figure 9 is a plan section indicated by the line 9—9 on Figure 6 and shows the manner of telescoping the members which support the roof of the coach and the side walls.
Figure 10 is a plan section indicated by the line 10—10 on Figure 7 showing details of construction in connection with the movable windows.
Figure 12 is a partial sectional view taken on the line 12—12 of Figure 1 showing the member which backs up the window pans where they join.
Figure 13 is a plan section indicated by the line 13—13 on Figure 12 showing the abutment of adjacent window pans and the butt strip therebeneath to which they are secured.

The posts 34 are flanged channels and the side walls thereof preferably diverge somewhat to form the configuration which is best seen in Figure 8 or 9.

Each of the side posts 34 extends vertically upward at the side of the coach and telescopically engages the end of a similarly shaped member 36 which extends across the top of the vehicle, forming the carline thereof, and into engagement with the post 34 at the opposite side. The members 36 form the support for the roof of the vehicle and are rigidly secured to the posts 34 as, for example, by riveting.

Figure 3:
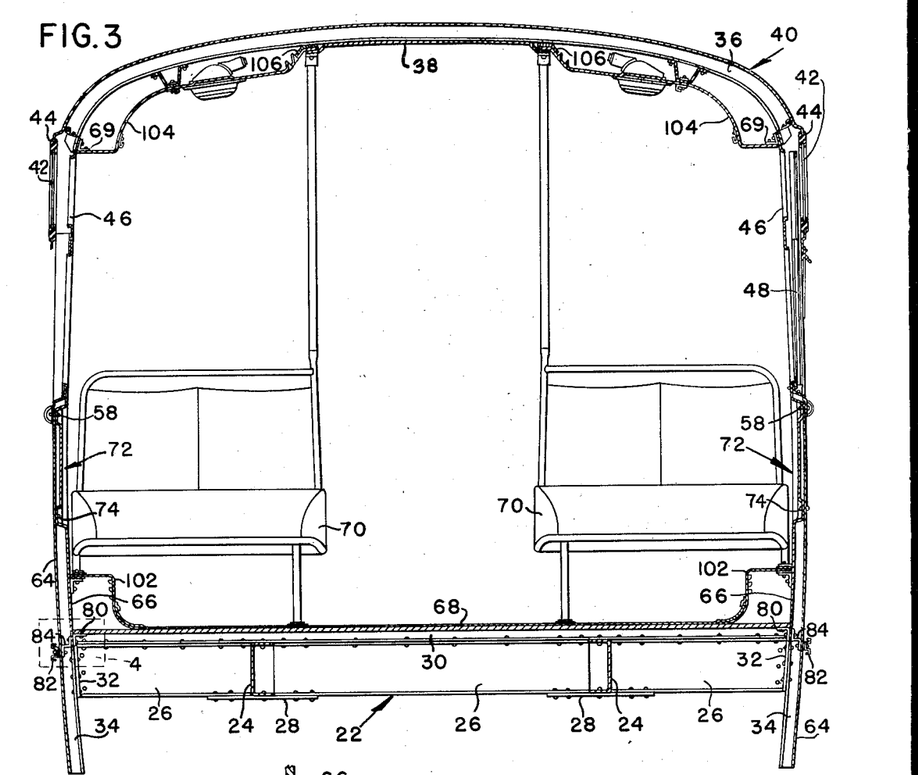
Figure 3 is a transverse view and is indicated by the line 3—3 on Figure 2.
Figure 11:
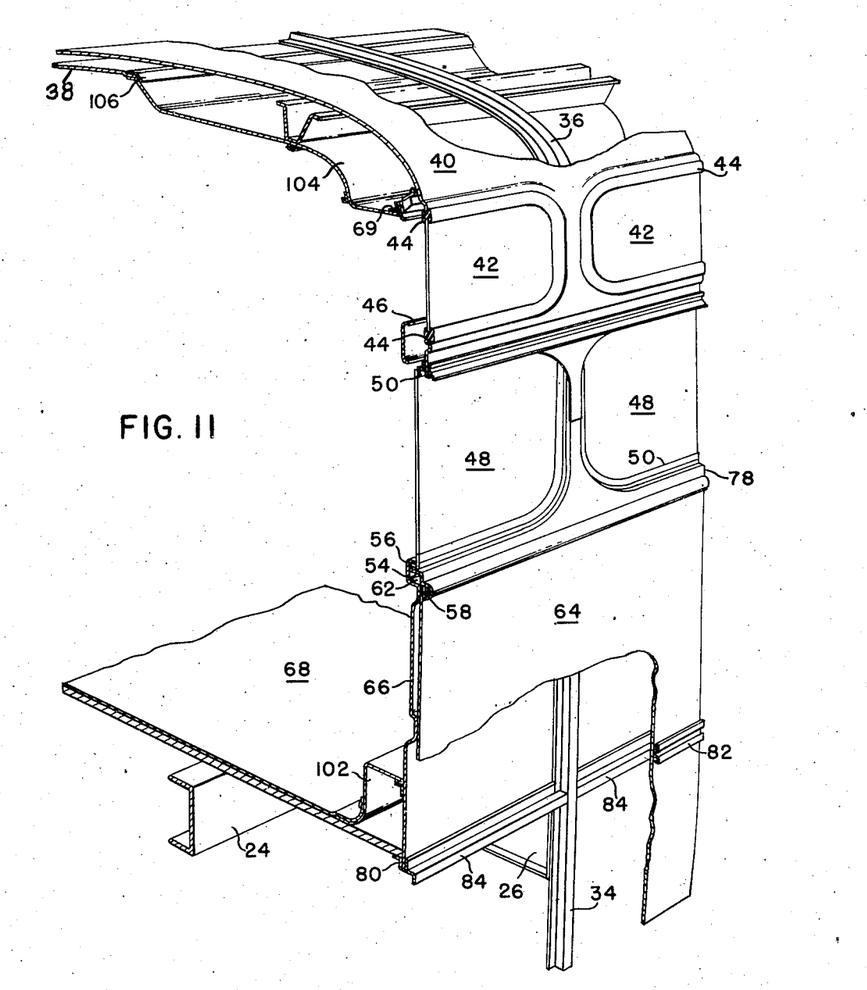
Figure 11 is a partial sectional perspective view with the outer covering broken away in parts to more clearly illustrate the coach framing.

Referring to Figures 3 and 11, it will be seen that the outer covering of the vehicle extends across the roof where it is indicated at 40 and then extends down the vehicle side walls. The inner covering of the vehicle may be continuous up the side walls and down the inside of the roof but preferably comprises side wall panels that terminate at the base of the roof and an intermediate inner roof section indicated at 38 which covers the said roof over the aisle portion of the vehicle. Both the inner and outer coverings are sheet metal, and preferably are formed of a light metal such as aluminum and are riveted to the channels 34 and 36 so that both the inside and outside walls of the vehicle are stress members. The arrangement is such that the vehicle walls together with the channels 34 and 36 form a continuous box girder which is light, strong, and easily assembled.

The outer roof covering 40 extends partially down the side walls and is apertured to receive the windows 42 which consist of stationary panes carried in a rubber-like frame or bezel 44. The roof panel terminates beneath the window 42 and forms a joint with the side wall along that line. The inner side wall covering is apertured as at 46 in alignment with the window 42 and the space between the coverings 38 and 40 is open to receive the lower sash of the window when it is lifted.

The window arrangement is better shown in Figure 7 wherein it will be noted that the lower of the windows indicated at 48 is carried in a sash 50 that is slidable in a frame 52. The frame 52 is rigidly mounted in a pan 54 which is secured to the inside side wall covering of the vehicle at 56 and to the outside side wall covering at 58. It will be noted in Figure 7 that the pan 54 and the inside wall covering 60 form a box girder structure at 62 which extends longitudinally along the side of the vehicle. This provides for a material stiffening of the vehicle walls between the posts 34 without requiring the weight of an additional structural member.

The outer covering of the side walls of the vehicle extends from the bottom of the skirt of the vehicle upwardly to connect with the window pans at 58. The outer covering from 58 upwardly to the lower edge of the roof panel 40 beneath the windows 42 consists of the window pans together with appropriate pier covers adjacent to the doors and at other points where the window pans do not afford a complete wall coverage.

Figure 1:
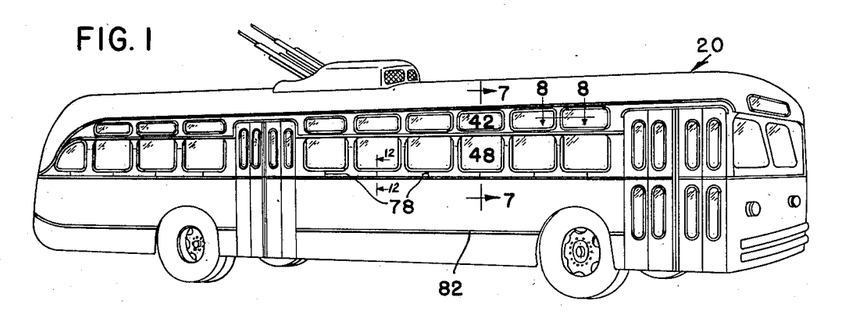
Figure 1 is a perspective view of a typical trolley coach constructed according to my invention.
Figure 2:
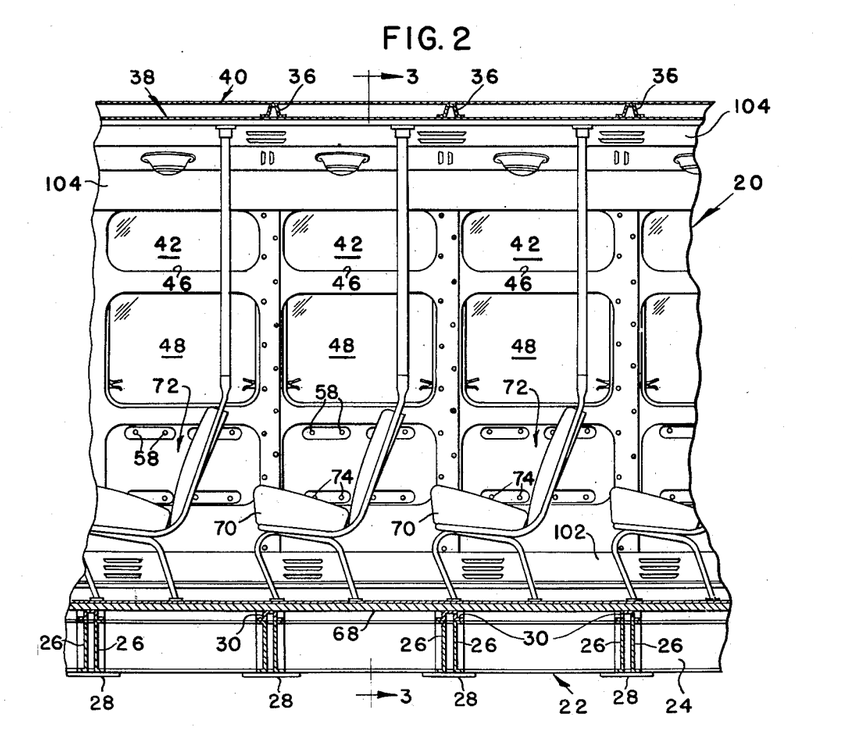
Figure 2 is a longitudinal view taken through the coach illustrated in Figure 1 showing more in detail parts of the vehicle.

The inner covering of the vehicle wall is indicated at 66 and will be seen in Figure 3 to commence from slightly beneath the level of the vehicle floor 68 and to extend upwardly therefrom to above the windows where it is riveted together with the inner roof covering to the longitudinally extending angle 69. The inner wall covering 65 consists of a plurality of panels, each of which reaches across one window and the adjacent posts and thus overlaps with the panels on both sides. This is best seen in Figures 2 and 9.

At the level of the seats 70, the panels are recessed at 72 in order to provide for more seating space and are riveted as at 74 to the outside covering 64. The inner and outer coverings are also rigidly secured together at the top of the recesses by the rivets at 58 which also secure the window pans in position.

Referring to Figures 1, 10, 12 and 13, it will be seen that each of the pans 54 which carry the window frames are formed to extend across one of the posts 34 and to meet the next adjacent pan section intermediate the side posts as at 78.

As seen in Figures 12 and 13, the window pans 54 abut as at 55 and beneath the joint formed by the abutment of the window pans is a butt strip 57 to which the window pans may be secured and which closes the joint therebetween.

By forming and mounting the window pans in this manner, a much more rigid structure results and large fillets may be employed for connecting the post section of the side wall with the other portions thereof. By this means the notching or interrupting of the vertical and horizontal strength members is eliminated and a considerably stronger assembly results. Furthermore, this type of construction wherein the window pan may be pressed or drawn from a sheet of metal permits the use of a round cornered sash and window with the resulting advantage of ease of sash manufacture, improved appearance, and greater serviceability.

Figure 4:
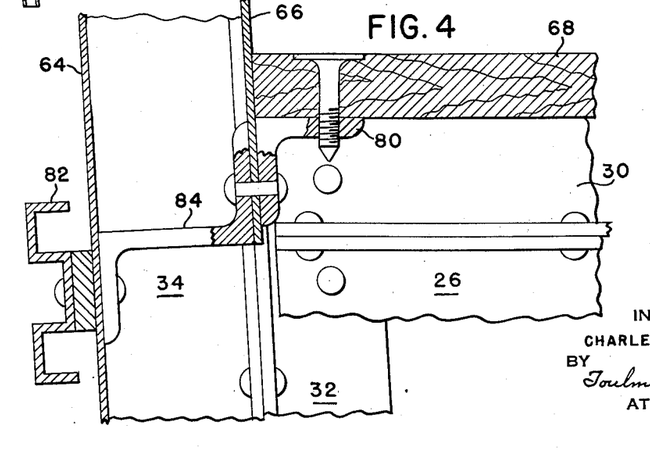
Figure 4 is a portion of Figure 3 drawn at greatly enlarged scale and is indicated by the dotted area marked 4 on Figure 3.

Returning to the construction of the sub-frame, in Figures 3 and 4 it will be noted that along each side of the vehicle is a floor supporting angle 80 which provides an additional support for the floor panel between the floor supporting channels 30. Extending along the outside of the vehicle slightly below the level of the floor is a rub-rail 82 which protects the outside of the coach from damage.

The rub-rail 82 and the floor supporting angle 80 are supported by a longitudinally extending Z-bar 84 which extends between the adjacent posts 34 and which is riveted to the said rub-rail and floor supporting angle through the inner and outer vehicle covers 66 and 64. The arrangement of the rub-rail, the floor supporting angle and the Z-bar, when secured to the posts 34 results in a rigid structural member extending along each side of the vehicle. It will be understood that the floor supporting angles 80 and the Z-bars 84 are discontinuous, being interrupted to accommodate the floor supports 30 and the posts 34, but that the rub-rails are substantially continuous.

Figure 5:
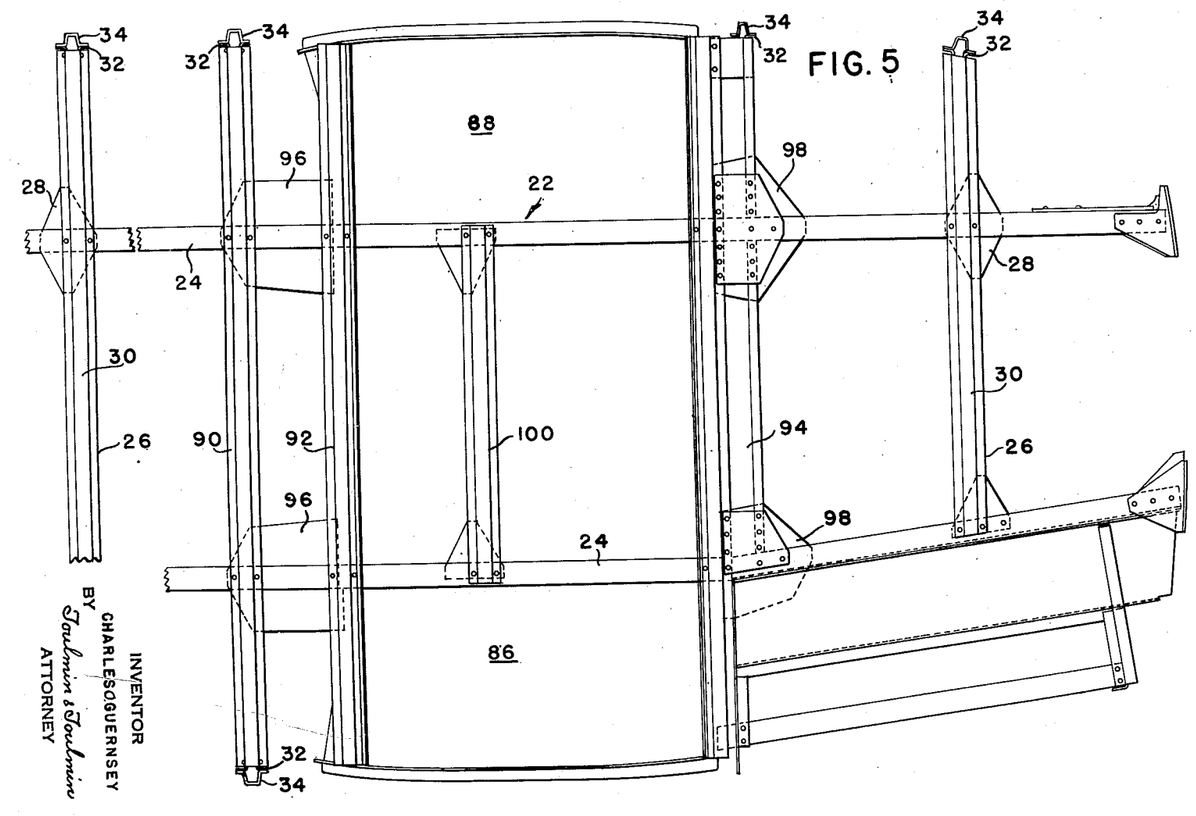
Figure 5 is a plan view taken over the front end of the trolley coach of Figure 1 and shows the frame work beneath the coach floor and the wall.
Figure 6:
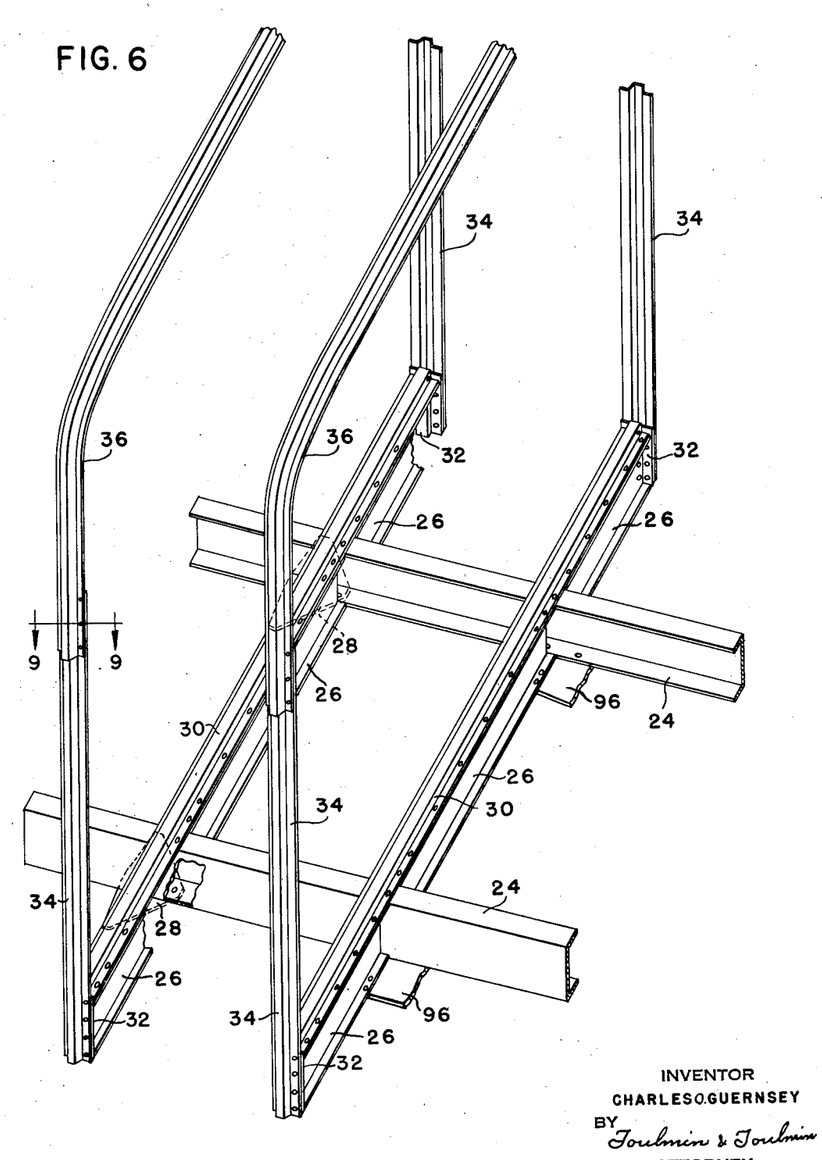
Figure 6 is a perspective view showing the frame work of the coach illustrated in Figure 1.

Figure 5 illustrates the sub-frame construction at the forward end of the coach and shows the manner of attaching the wheel wells 86 and 88 to the said sub-frame. These wells are sheet metal structures and are carried on the sub-frame as by riveting. In Figure 5 it will be noted that there are cross-members at 90, 92 and 94 adjacent the wheel wells. These cross-members are connected with the sills 24 in the usual manner and there may be provided on the lower side of the frame the brackets 96 and 98 which form supporting pads for the spring shackles of the vehicle. The stresses on the spring shackles are transmitted into the rigid sub-frame and therethrough to the box-girderlike vehicle body.

Figure 5 also illustrates an auxiliary cross-member as at 100 which is for the purpose of providing additional support for the vehicle flooring in an area of greater than average load.

The vehicle may be fitted with the usual operating auxiliaries such as motors and ventilating systems as desired. Figures 2 and 3 illustrate one form of ventilating arrangements wherein there are the floor ducts 102 extending along either side of the vehicle and adjacent the floor, and the ducts 104 which are supported adjacent the vehicle roof. These ducts are preferably removable and are detachably secured to the angles 69 at their lower edges and to the angles 106 at their upper edges. The angles 69 and 106 extend longitudinally of the vehicle and provide additional strength means.

It will be evident from the foregoing description that the present invention provides for a vehicle constructed especially well adapted for trolley coaches and the like wherein a relatively light vehicle may be constructed without sacrificing any of the necessary strength. This is accomplished by employing a high strength material for both the inner and outer sheathings of the vehicle, and so securing the said sheathings to their supporting members that they act as strength members. This sheathing material is preferably, although not necessarily, an aluminum alloy for strength and lightness.

An additional advantage in the present invention lies in the provision of the recessed areas at the ends of the seats which makes greater seating space without sacrificing any of the structural strength.

Still another advantage of the construction according to this invention is that the improved window construction wherein the entire window assembly is carried in an auxiliary frame, is more easily manufactured and serviced, and the resulting structure provides for strength in the side wall without the use of additional strength members.

It will be understood that this invention is susceptible to modification in order to adapt it to different usages and conditions and, accordingly, it is desired to comprehend such modifications within this invention as may fall within the scope of the appended claims.

I claim:

1. In a closed type vehicle; frame, side walls and a roof, said side walls consisting of spaced sheathings, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame extending upwardly between said inner and outer sheathings, each post means comprising a flanged channel of general U-shaped cross-section; means for attaching said flanges of each post to one of said sheathings and the base of the U to the other of said sheathings to thereby define by means of said one sheathing and said U-shaped channels a plurality of continuous box girders extending from said frame to and including said roof and back to said frame on the opposite side of said vehicle.

2. In a closed type vehicle; frame, side walls and a roof, said side walls consisting of spaced sheathings, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame extending upwardly between said inner and outer sheathings, each post means comprising a flanged channel of general U-shaped cross-section; means for attaching said flanges of each post to one of said sheathings and the base of the U to the other of said sheathings to thereby define by means of said one sheathing and said U-shaped channels a plurality of continuous box girders extending from said frame to and including said roof and back to said frame on the opposite side of said vehicle, each box girder extending between a pair of reenforcing recessed portions and between a pair of inner sheathing openings, and a corresponding pair of outer sheathing openings, means directly connecting said outer sheathing to the recessed portions of said inner sheathing, means connecting said inner sheathing to said frame, each pair of juxtaposed window openings of said inner and outer sheathings having a window frame and means rigidly connected to each of said window frames and connecting the same to said inner and outer sheathings.

3. In a closed type vehicle; frame, side walls and a roof, said side walls consisting of spaced sheathings, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, each post means comprising a flanged channel of general U-shaped cross-section; means for attaching said flanges of each post to inner of said sheathings and the base of the U to the other of said sheathings to thereby define by means of said inner sheathing and said U-shaped channels a plurality of continuous box girders extending from said frame to and including said roof and back to said frame on the opposite side of said vehicle, each box girder extending between a pair of reenforcing recessed portions and between a pair of inner sheathing openings, and a corresponding pair of outer sheathing openings, means directly connecting said outer sheathing to the recessed portions of said inner sheathing, means connecting said inner sheathing to said frame, each pair of juxtaposed window openings of said inner and outer sheathings having a window frame and means rigidly connected to each of said window frames and connecting the same to said inner and outer sheathings.

4. In a closed type vehicle; a frame, side walls and a roof, said side walls consisting of spaced sheathings, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, a post attached to said frame and extending upwardly between said inner and outer sheathings, said window openings extending on both sides of said vehicle in rows, said post extending between a pair of window openings in each sheathing, said inner sheathing including metal sheets, at least a pair of which have vertical adjacent sides which are attached to one of said post means between a pair of window openings, said outside sheathing including metal sheets, at least a pair of which comprises an upper and a lower sheet, which sheets are attached to said post means between a pair of horizontally spaced window openings, the upper of said last named pair of sheets being integral with and forming a continuation of said roof, said outside pair of sheets extending laterally across a post whereby to provide sheets of said inner sheathing and outer sheathing with the inner sheets extending continuously from roof to frame along one of said posts the vertical edges of which are joined to said post and outer sheets which extend continuously across said post above and below a pair of window openings the said outer sheets being joined between said pair of horizontally spaced window openings.

5. In a closed type vehicle; frame, side walls and a roof, said side walls consisting of an inner and an outer sheathing, said roof forming a continuation of said outer sheathing, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, a post attached to said frame and extending upwardly between said inner and outer sheathings, said window openings extending on both sides of said vehicle in rows, said post extending between a pair of window openings in each sheathing and between a pair of recessed portions of said inner sheathing, said inner sheathing including metal sheets, at least a pair of which have vertical adjacent sides which are attached to one of said post means between vertical rows of window openings, said outside sheathing including metal sheets, at least a pair of which comprises an upper and a lower sheet, which sheets are attached to said post means between a pair of window openings, the upper of said last named pair of sheets being integral with said roof sheets and said outside pair of sheets extending laterally across a post forming a continuation of said roof whereby to provide sheets of said inner sheathing and outer sheathing with the inner sheets extending continuously from roof to frame along one of said posts the vertical edges of which are joined to said post and outer sheets which extend continuously across said post above and below a pair of window openings the said outer sheets being joined between said pair of horizontally spaced window openings.

6. In a closed type vehicle; a frame, side walls and a roof, said side walls and roof each consisting of spaced sheathings, said outer side sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a plurality of post means attached to said frame and extending upwardly between said inner and outer sheathings, said window openings extending on both sides of said vehicle in rows which are spaced vertically from each other to provide upper and lower horizontal rows of window openings, each post means extending between vertical rows of window openings in each sheathing and between a pair of recessed portions of said inner sheathing, said inner sheathing including metal sheets, at least a pair of which have vertical adjacent sides which are attached to one of said post means between vertical rows of window openings, said outside sheathing including metal sheets, at least a pair of which comprises an upper and a lower sheet, which sheets are attached to said post means between a pair of horizontally spaced lower window openings, the upper of said last named pair of sheets being integral with said roof sheets and said outside pair of sheets extending laterally across a post forming a continuation of said roof whereby to provide sheets of said inner sheathing with the inner sheets extending continuously from roof to frame along one of said posts the vertical edges of which are joined to said post and outer sheets which extend continuously across said post above and below a pair of window openings the said outer sheets being joined and outer sheathing between said pair of horizontally spaced window openings, means directly connecting said outer sheathing to the recessed portions of the inner sheathing.

7. In a closed type vehicle; a frame, side walls and a roof, said side walls consisting of an inner and an outer sheathing, said roof forming a continuation of said outer sheathing, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, said window openings extending on both sides of said vehicle in rows which are spaced vertically from each other to provide upper and lower horizontal rows of window openings, said post extending between vertical rows of window openings in each sheathing and between a pair of recessed portions of said inner sheathing, said inner sheathing including metal sheets, at least a pair of which comprises an upper and a lower sheet, which sheets have vertical adjacent sides which are attached to one of said posts between vertical rows of window openings, said outside sheathing including metal sheets, at least a pair of which are attached to said post means between a pair of horizontally spaced lower window openings, the upper of said last named pair of sheets being integral with said roof sheets and said outside pair of sheets extending laterally across a post forming a continuation of said roof whereby to provide sheets of said inner sheathing and outer sheathing with the inner sheets extending continuously from roof to frame along one of said posts the vertical edges of which are joined to said post and outer sheets which extend continuously across said post above and below a pair of window openings the said outer sheets being joined between said pair of horizontally spaced window openings, means directly connecting said outer sheathing to the recessed portions of the inner sheathing.

8. In a closed type vehicle; a frame, side walls and a roof, said side walls consisting of an inner and an outer sheathing, said roof forming a continuation of said outer sheathing, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, said window openings extending on both sides of said vehicle in rows which are spaced vertically from each other to provide upper and lower horizontal rows of window openings, said post extending between vertical rows of window openings in each sheathing and between a pair of recessed portions of said inner sheathing, said inner sheathing including metal sheets, at least a pair of which comprises an upper and a lower sheet, which sheets have vertical adjacent sides which are attached to said post between vertical rows of window openings, said outside sheathing including metal sheets, at least a pair of which are attached to said post means between a pair of horizontally spaced lower window openings, the upper of said last named pair of sheets being integral with said roof sheets and forming a continuation of said roof, said outside pair of sheets extending laterally across a post whereby to provide sheets of said inner sheathing and outer sheathing with the inner sheets extending contiuously from roof to frame along one of said posts the vertical edges of which are joined to said post and outer sheets which extend continuously across said post above and below a pair of window openings the said outer sheets being joined between said pair of horizontally spaced window openings, a window frame extending between oppositely positioned window openings of said inner and outer sheathings and means rigidly connecting said last named frame to said inner and outer sheathings.

9. In a closed type vehicle; a frame, side walls and a roof, said side walls and roof each consisting of spaced stress sheathings, said outer sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, said window openings and extending on both sides of said vehicle in rows which are spaced vertically from each other to provide upper and lower horizontal rows of window openings, said post extending between vertical rows of window openings in each sheathing and between a pair of recessed portions of said inner sheathing, said inner sheathing including metal sheets, at least a pair of which comprises an upper and a lower sheet, which sheets have vertical adjacent sides which are attached to one of said post means between vertical rows of window openings, said outside sheathing including metal sheets, at least a pair of which are attached to said post means between a pair of horizontally spaced lower window openings, the upper of said last named pair of sheets being integral with and forming a continuation of said roof, said outside pair of sheets extending laterally across a post whereby to provide sheets of said inner sheathing and outer sheathing with the inner sheets extending continuously from roof to frame along one of said posts the vertical edges of which are joined to said post and outer sheets which extend continuously across said post above and below a pair of window openings which overlap between said pair of horizontally spaced window openings, means directly connecting said outer sheathing to the recessed portions of the inner sheathing, a window frame extending between oppositely positioned window openings of said inner and outer sheathings and means rigidly connecting said last named frame to said inner and outer sheathings.

10. In a closed type vehicle; a frame, side walls and a roof, said side walls and roof each consisting of spaced stress sheathings, said outer side sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, each post means comprising a flanged channel of general U-shaped cross-section, means for attaching said flanges of each post to one of said sheathings and the base of the U to the other of said sheathings to thereby define by means of said one sheathing and said U-shaped channels a plurality of continuous box girders extending from said frame to and including said roof and back to said frame on the opposite side of said vehicle, each box girder extending between a pair of recessed portions and between a pair of inner sheathing openings, and a corresponding pair of outer sheathing openings, means directly connecting said outer sheathing to the recessed portions of said inner sheathing.

11. In a closed type vehicle; a frame, side walls and a roof, said side walls and roof each consisting of spaced sheathings, said outer side sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a post attached to said frame and extending upwardly between said inner and outer sheathings, each post means comprising a flanged channel of general U-shaped cross-section, means for attaching said flanges of said post to one of said sheathings and the base of the U to the other of said sheathings to thereby define by means of said one sheathing and said U-shaped channels a plurality of continuous box girders extending from said frame to and including said roof and back to said frame on the opposite side of said vehicle, each box girder extending between a pair of recessed portions and between a pair of inner sheathing openings, and a corresponding pair of outer sheathing openings, each pair of juxtaposed window openings of said inner and outer sheathings having a frame, and means rigidly connected to each of said window frames and connecting the same to said inner and outer sheathings.

12. In a closed type vehicle; a frame, side walls and a roof, said side walls and roof each consisting of spaced stress sheathings, said outer side walls of sheathing being substantially flat to provide plain surfaces on the sides of the vehicle, a plurality of spaced window openings in said sheathings, each window opening in said outer sheathing being in juxtaposed position to a corresponding opening in said inner sheathing in order to provide pairs of aligned window openings, said inner sheathing having recessed portions, each recessed portion being located below a window opening in said inner sheathing whereby to provide for more vehicle seating space, a plurality of post means attached to said sub-frame and extending upwardly between said inner and outer sheathings, each post means comprising a flanged channel of general U-shaped cross-section, means for attaching said flanges of each post to one of said sheathings and the base of the U to the other of said sheathings to thereby define by means of said one sheathing and said U-shaped channels a plurality of continuous box girders extending from said frame to and including said roof and back to said frame on the opposite side of said vehicle, each box girder extending between a pair of recessed portions and between a pair of inner sheathing openings, and a corresponding pair of outer sheathing openings, each pair of juxtaposed window openings of said inner and outer sheathings having a frame, and means rigidly connected to each of said window frames and connecting the same to said inner and outer sheathings, and means directly connecting said recessed portions of said inner sheathing to said outer sheathing.

13. In a vehicle, a sub-frame, a plurality of vertically disposed spaced frame members mounted on said sub-frame and stressed spaced parallel sheets on either side of said vertical frame members, and at least one of said sheets being connected to the vertical frame members, the inner sheets having edges joined to the vertical frame members and the outer sheet extending across said frame members so as to extend to at least three vertical frame members, said parallel sheets being fastened to one another by the spaced vertical posts, the inner of certain of said sheets each having a countersunk area, a second means of attachment of the inner and outer sheets being located in said countersunk areas, the outer wall of the inner sheet abutting the inner wall of the outer sheet, said countersunk area in each sheet being located beneath a window opening in both sheets, said countersunk areas being so arranged that the inner sheet is spaced from the outer sheet between each of said counter areas, in which space is located the vertical frame members which are attached thereto.

14. In a vehicle, a sub-frame, a floor mounted thereon, vertical posts channel shaped in cross section and side walls and roof mounted thereon, seats mounted on the outsides of said floor between said posts, a skin mounted on the inside of said posts in a series of vertically disposed overlapping sheets, a skin mounted on the outside of said posts consisting of a sheet extending across at least three posts, the inner skin including countersunk sheets to provide extra space opposite the outer ends of the seats and means to fasten the countersunk portion of the inner sheet to the outer sheet and means to join the outer and inner sheets to form a window frame adjacent to the seat, at least one sheet being fastened to the vertical post to form a box girder therewith.

15. In a vehicle, a frame, a series of vertical posts mounted in said frame spaced from one another adapted to carry the side walls and roof of a vehicle, spaced vertically disposed stress sheets on either side of said posts, the inner sheets arranged so that the vertically disposed sheets are overlapping and attached to one another along vertical joints, the juncture of at least one series of said sheets being located between said posts, the inner of said sheets having countersunk portions to provide additional width of the vehicle body in the regions of the vehicle seats, said countersunk portions being attached to the outer sheets, and other spaced portions provided with aligned openings for window frames between said posts and a space area between said frames for the reception of windows mounted in said frames when the windows are moved to an open position.

16. In a vehicle, a frame, a series of vertical channel posts mounted in said frame spaced from one another adapted to carrying the side walls and roof of the vehicle, spaced stress sheets on one side of said posts arranged in vertically disposed sheets overlapping and attached to one another along vertical joints, the juncture of at least one series of said sheets being located between said posts, the inner of said sheets having countersunk portions attached to the outer sheet and other spaced portions for window frames between said posts and a space area for the reception of windows mounted in said frame when moved to an open position, and means of attaching at least one of said sheets so as to form with said posts a reinforcing box girder.

CHARLES O. GUERNSEY.

REFERENCES CITED

The following references are of record in the file of this patent:

UNITED STATES PATENTS

| Number | Name | Date |
|---|---|---|
| 856,435 | Wagenhals | June 11, 1907 |
| 1,090,595 | Brinkerhoff | Mar. 17, 1914 |
| 1,112,855 | Sisson | Oct. 6, 1914 |
| 1,475,328 | Wales | Nov. 27, 1923 |
| 1,553,527 | Hamel | Sept. 15, 1925 |
| 1,700,090 | Templin | Jan. 22, 1929 |
| 1,987,361 | Clements | Jan. 8, 1935 |
| 2,056,202 | Morrison | Oct. 6, 1936 |
| 2,192,928 | Morrison | Mar. 12, 1940 |
| 2,239,089 | Fageol | Apr. 22, 1941 |
| 2,254,193 | Augustine | Aug. 26, 1941 |
| 2,405,394 | Austin | Aug. 6, 1946 |